US005777632A

United States Patent [19]

Tanaka

[11] Patent Number: 5,777,632

[45] Date of Patent: Jul. 7, 1998

[54] STORAGE CONTROL SYSTEM THAT PROHIBITS WRITING IN CERTAIN AREAS

[75] Inventor: Mizue Tanaka, Kanagawa, Japan

[73] Assignee: NEC Corporation, Tokyo, Japan

[21] Appl. No.: 545,405

[22] Filed: Oct. 19, 1995

[30] Foreign Application Priority Data

Oct. 19, 1994 [JP] Japan .................................... 6-253852

[51] Int. Cl.[6] .................................... G06F 15/62

[52] U.S. Cl. .................................... 345/523; 345/521

[58] Field of Search .................................... 395/164, 166, 395/134, 135, 523, 517, 525; 365/189.01; 345/118, 119, 523, 525, 517, 191

[56] References Cited

U.S. PATENT DOCUMENTS

| | | | |
|---|---|---|---|
| 4,710,767 | 12/1987 | Sciacero et al. | 345/191 |
| 4,941,111 | 7/1990 | Sfarti | 395/157 |
| 4,984,183 | 1/1991 | Ohuchi | 395/134 |
| 5,185,859 | 2/1993 | Guttag et al. | 395/513 |
| 5,218,674 | 6/1993 | Peaslee et al. | 395/525 |
| 5,255,360 | 10/1993 | Peaslee et al. | 395/523 |
| 5,274,364 | 12/1993 | Li et al. | 345/118 |
| 5,276,437 | 1/1994 | Horvath et al. | 345/119 |
| 5,493,646 | 2/1996 | Guttag et al. | 395/164 |
| 5,515,494 | 5/1996 | Lentz | 395/157 |
| 5,604,917 | 2/1997 | Saito et al. | 395/869 |

FOREIGN PATENT DOCUMENTS

| | | |
|---|---|---|
| 0 150 453 | 8/1985 | European Pat. Off. . |
| 0 278 526 | 8/1988 | European Pat. Off. . |
| 2 628 555 | 9/1989 | France . |
| 63-8951 | 1/1988 | Japan . |

OTHER PUBLICATIONS

Patent Abstracts of Japan, vol. 12, No. 291 (E-644), Aug. 9, 1988.

*Primary Examiner*—Tod R. Swann
*Assistant Examiner*—Christopher Chow
*Attorney, Agent, or Firm*—Sughrue, Mion, Zinn, Macpeak & Seas, PLLC

[57] ABSTRACT

In a display memory 10, a display data storage area designation register 11 designates a display data storage area, and a mask bit width designation register 12 designates a write mask bit width. According to certain data provided by address parameters of a re-writable memory, the display data storage area designation register, and the mask bit width designation register, a mask control signal generator 13 provides a mask control signal for an external address data to a write control unit 14. The mask control signal is generated from a set of comparisons based on the width of the re-writable memory and the mask bit width to determine what data in the memory may be re-written. The write control unit 14 writes only certain bits of external write data into the display memory 10.

9 Claims, 7 Drawing Sheets

STORAGE CONTROL SYSTEM THAT PROHIBITS WRITING IN CERTAIN AREAS

BACKGROUND OF THE INVENTION

The present invention relates to storage control systems for storing data and, more particularly, to a storage control system and method for efficiently processing the display data.

In storage control systems for displaying data on fluorescent display panels, there is a trend towards increasing the amount of display data to be processed which increases the complication of the display. Also, there is a trend towards increasing the frequency of the display data re-writing in order to realize a large variety of displays.

Meanwhile, in the time-division drive display, data that are always re-written such as segment data and data that are not re-written after initially setting the time-division drive data determined by the fluorescent display panel such as digit data, may be present as the display data in the same address memory, and writing control in given bit units may be necessary.

FIG. 3 is a map view of a display memory having areas of addresses 130 to 17F and capable of accessing 8 bits for each address and displaying data of 5 addresses as a unit.

The shaded area is a digit data storage area which does not require re-writing of the data for the use of the display memory, that is, it is a write prohibit area. The area on the left side of the shaded area is a segment data storage area for the display data output, that is, a write permit area requiring re-writing of data.

As prior art example 1, a storage control system will now be described, in which software logic operations are performed for re-writing the data. First, a check is made as to whether an externally supplied address is one in which a write permit area or a write prohibit area is present. If the result of the check when the write prohibit area is present in that address is "right", in case when the address contains bits that are not re-written, that is, in order to hold the bit which are data to be masked, data in which only bits not to be re-written and hence masked is obtained by logically ANDing the data in which only write permit data is cleared to "0" among the read-out data and the data having initially been stored in the corresponding address. Then, the write data and the data in which write prohibit bits are cleared to "0" are logically ANDed to obtain the data in which only write permit bits are made effective. Subsequently, a logical OR operation is executed with the read-out data in which only bits to be masked are held, thus effecting the re-writing of the sole effective bits for the address.

FIG. 7 shows a flow chart of operation wherein data "01010001B" (B being indicative of binary data) is stored in address No. 165 of the display memory shown in FIG. 3, access address No. 165 and write data "11101000B" are externally supplied. In address No. 165, 0-th bit is a digit data area, i.e., write prohibit area.

A check is first made as to whether the externally supplied address is address No. 16X in which 0-th bit is a write prohibit area. Since the check result is "right", the data "01010001B" in address No. 165 is read out and logically ANDed with the data "00000001B" to hold the 0-th bit data. Then, the write data "11101000B" and "11111110B" are logically ANDed, and the write data "11101000B" in which 7-th to 1-st bits are effective data and the read-out data "00000001B" in which only the 0-th bit is held are logically ORed. The result data "11101001B" is written in the address No. 165 of the display memory.

Now, a case will now be described when address 173 and data "01010101B" are externally supplied as access address and write data, respectively, while data "11010110B" is stored in address 173 in the display memory shown in FIG. 3. The address 173 is an all bit write permit area.

In the first place, a check is made as to whether address 16X, i.e., 0-th bit, of the externally supplied address is a write prohibit area. The result of the check is "No", and a next check is thus made as to whether address 17X of the externally supplied address is an all bit write permit area.

Since the result of the check is "YES", the write data "01010101B" is written in address 173 of the display memory.

In this prior art example, one re-writing of a segment data group in write permit area, i.e., an area of 7-th to 1-st bits of addresses No. 17X and No. 16X in the FIG. 3 example, requires about 220 steps. Usually, for display n times segment data group re-writing requires about 220xn program steps, leading to extreme reduction of the ROM efficiency and program processing efficiency. Further, software developers always have to set the mask data in software in advance by taking bits to be masked into consideration.

Now, as prior art example 2, storage control of "Data storage system having registers with mask data stored therein" disclosed in Japanese Patent Laid-Open Publication Showa 63-8951 will be described. In this example 2, the software process is implemented with hardware.

Heretofore, where a write permit area and a write prohibit area are present on a display memory, it has been the practice to prepare registers for setting mask data in access units of the display memory in a number corresponding to the bit width of the display memory access unit, select among these registers a register with mask data corresponding to the address to be accessed, make operations on the mask data that has been set by the selected register and the write data using the selected register and write the result of operations in the display memory.

FIG. 8 is a block diagram showing a data storage system having a plurality of registers for storing mask data corresponding to the display memory access unit bit width. In this example, a display memory 10 is accessed in units of 8 bits, and display data is stored in this memory. The controller 59 controls an externally supplied address data, and supplies data to the two-dimensional address generator 55, variable bit width logical operation unit 57, and bit access controller 58. Effective bit width registers 51 to 54 are 8-bit registers, in which mask data corresponding to the access unit (i.e., 8 bits) of the display memory 10 is stored.

FIG. 9 shows fixed data in the effective bit width registers 51 to 54 when realizing a mask example of data in the display memory 10 shown in FIG. 3. Bit "1" is re-writable bit, and bit "0" is a bit to be masked. A two-dimensional address generator 55 designates an address range of an area in the display memory 10, to which the master data of the effective bit width designation registers 51 to 54 are designated. When an access address of the display memory 10 is in a range that is set by the two-dimensional address generator 55, the effective bit width registers 51 to 54 are selected via a selector 56. A variable bit width logical operation unit 57 performs operations on externally supplied write data, the mask data from the selected effective bit width register and the data stored in the re-write subject address of the display memory 10 which is as read out by a bit access control unit 58. The result of operations is stored in the re-write subject address of the display memory 10 via the bit access control unit 58.

Operation will now be described in connection with an example, in which the data "01010001B" is stored in address No. 165 of the display memory in FIG. 3 as explained in the prior art example 1. When the data "11101000B" is externally supplied as the write data to address No. 165, the two-dimensional address generator 55 and selector 56 select the effective bit width register 52, in which master data corresponding to the address No. 165 is stored, and the mask data "11111110B" is supplied to the variable bit width logic operation unit 57. In the variable bit width logic operation unit 57 externally supplied write data "11101000B" and the mask data "11111110B" are logically ANDed. The 0-th bit of the external write data is thus nullified, thus providing data "11101000B". The variable bit width logic operation unit 57 is supplied with the data "01010001B" in address No. 165 of the display memory 10 via the bit access control unit 58 and executes a logical AND operation of this data "01010001B" and the data "00000001B" as inversion data of the mask data from the effective bit width register 52. The result of operation is "00000001B", and the value of the 0-th bit in the address No. 165 of the display memory 10 is held.

In the above way, the external write data having been bit operated is logically ORed with the logically ANDed result of the data "00000001B" as the inversion data of the mask data from the effective bit width register 52 and the data "01010001B" in the address No. 165 of the display memory 10. Thus, the write mask processed data "11101001B" is written in the address No. 165 of the display memory 10. In the storage control in the prior art data storage system as shown, it is required to provide a selector which serves to select registers for setting the mask data in access units of the display memory according to a number of the access unit bit width of the display memory 10 and also select an access unit width register in correspondence to the select address.

For example, after the data that is always re-written such as fluorescent display panel display segment data and the time-division drive data determined by the fluorescent display panel such as the digit data have been initially set, if the write control in given bit units is necessary with the presence in the same address of memory of data that is not re-written, according to the data storage system as shown in FIG. 8 effective bit width registers for storing display memory access unit mask data are necessary in a number corresponding to the display memory access unit bit number, and this means an increase of number of the elements.

Further, the variable bit width logic operation unit 57 performs operations on three different data, i.e., externally supplied write data, the mask data from the selected effective bit width register and the data stored in a re-write subject address of the display memory 10 as read out by the bit access control unit 58. Therefore, the variable bit width logic operation unit is complicated in circuit construction, the number of overall elements is increased, and the chip size is increased. Further, it has been necessary to store the result of operations in the variable bit width logic operation unit 57 in a re-write subject address of the display memory 10 via the bit access control unit 58, thus requiring time for the data write process.

SUMMARY OF THE INVENTION

According to one aspect of the present invention, there is provided a storage control system having a memory with a memory element array and a memory access unit for accessing the memory in predetermined bit width units, comprising: means for holding data to designate an area not requiring re-writing of stored content in the memory; means for comparing a memory address and the data; and means for prohibiting writing of data in a memory element corresponding to the area not requiring re-writing of stored content if it is found as a result of comparison in the comparing means that the area not requiring change of stored content is contained in the bit width designated by the compared address.

According to another aspect of the present invention, there is provided a storage control system comprising: a memory divided by plurality of bit boundaries; means for accessing the memory with a number of bits between adjacent bit boundaries as a unit; and prohibiting means for prohibiting change of data with respect to a specific area of the memory; the prohibiting means designating a write prohibit address on the basis of first data for prescribing at least one side of the specific area and second data for prescribing the width of the specific area.

According to other aspect of the present invention, there is provided a storage control method for controlling reading and writing of data with respect to a memory divided by a plurality of bit boundaries, comprising: a first step of designating a write prohibit area; a second step of judging whether any bit boundary is present in the prohibit area; and a third step of permitting writing of all data in the memory if it is found as a result of the judgment that no bit boundary is present and prohibiting the change of data in a write prohibit area by calculating the bit width corresponding to the write prohibit area on the basis of the bit boundaries if the bit boundary is present.

According to further aspect of the present invention, there is provided a storage control system comprising: a display memory having a write permit area and a write prohibit area in which and from which data is written in and read out in response to an externally supplied address; display data storage area designation register for designating the X and/or Y direction display bit widths of display data stored in the display memory in response to display bit width designation data; a mask bit width designation register for designating the mask bit width of data to be masked, i.e., data that is not re-written among the display bit widths designated by the display data storage area designation register in response to mask bit width designation data; the display data storage area designation register and mask bit width designation register designating X and/or Y direction bit widths on the map of the display memory; a write judgment/designation signal generator for determining the opposite ends of the write prohibit area in the display memory to define four different states of address, an address in which all the bits are in a write permit area, an address in which predetermined upper bits are in a write permit area and predetermined lower bits are in a write prohibit area, an address in which all the bits are in a write prohibit area, and an address in which predetermined upper bits are in a write prohibit area and predetermined lower bits are in a write permit area, determining the address in either of the four data mask state that corresponds to supplied address data, and generating a write permit signal and a write prohibit signal with respect to the bit unit corresponding to the address; and a write control unit for writing only effective bits of the write data in the display memory according to the write permit signal and write prohibit signal with respect to the bit unit supplied from the write judgment/designation signal generator.

Other objects and features will be clarified from the following description with reference to attached drawings.

PREFERRED EMBODIMENTS OF THE INVENTION

Figure 1:
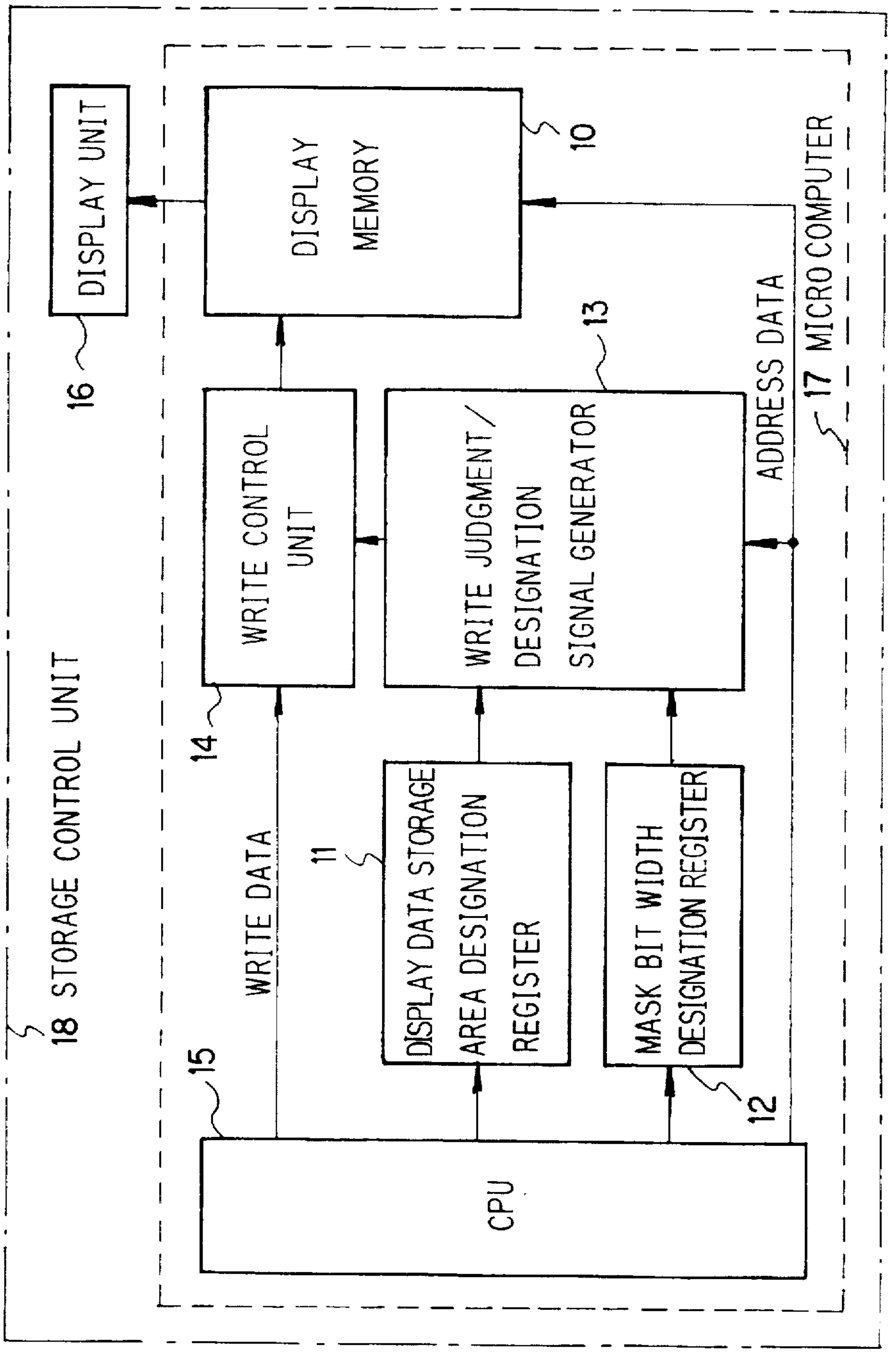
FIG. 1 is a block diagram showing a first embodiment of the storage control system according to the present invention.

Preferred embodiments of the present invention will now be described with reference to the drawings. FIG. 1 is a block diagram showing a first embodiment of the storage control system according to the present invention.

Figure 3:
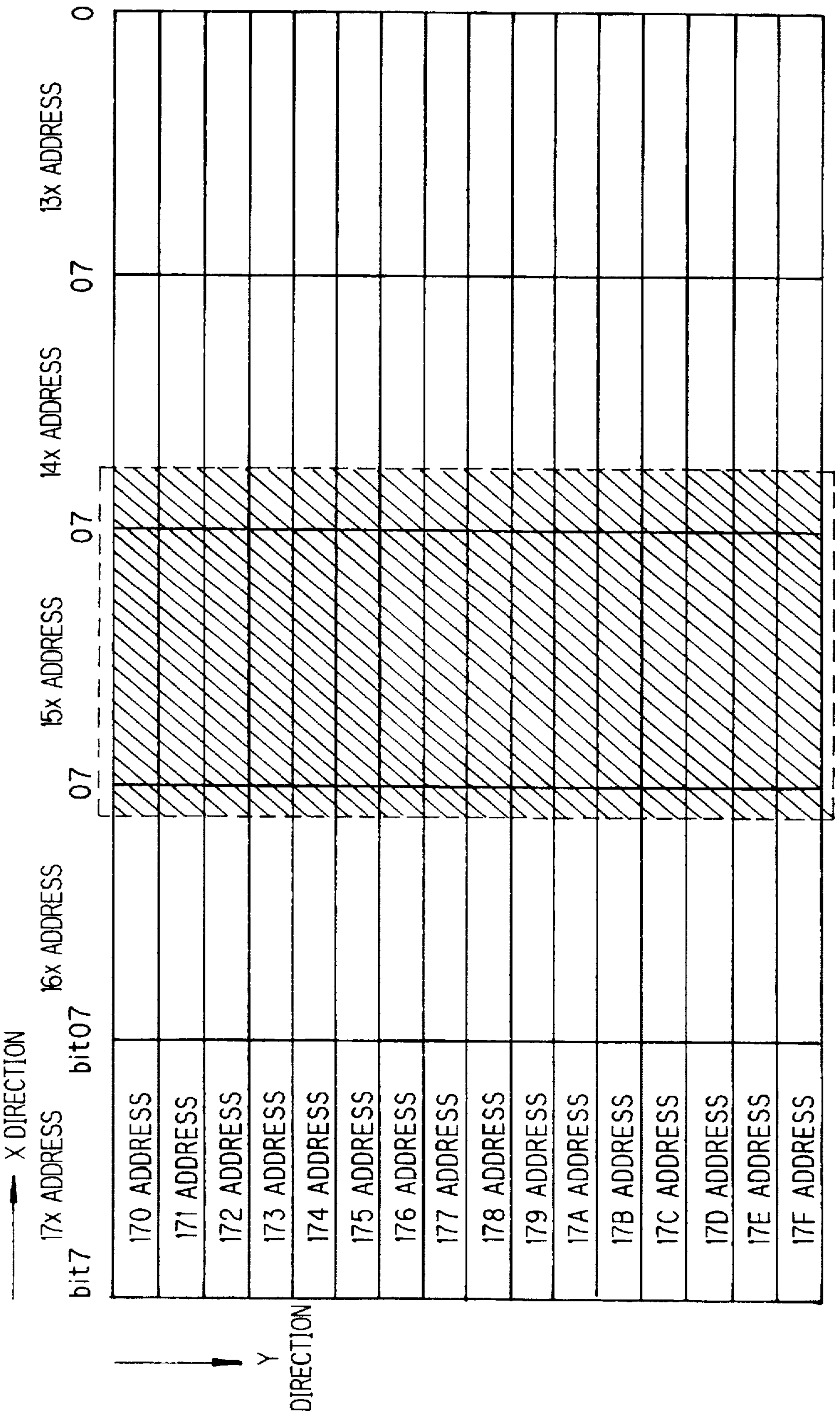
FIG. 3 is a map view of a display memory according to the prior art and the present invention.

Individual components of the system will now be described. A display memory 10 has a write permit area and a write prohibit area. Data is written in and read out from the supplied address of the display memory in response to an externally supplied address. FIG. 3 shows the memory map of the display memory 10. As shown, the memory has areas of addresses No. 130 to No. 17F. Each address is capable of 8-bit accessing, and data of five addresses can be displayed as one unit data.

This embodiment is a storage control system 18 comprising a display unit 16 and a microcomputer 17. The display unit 16 can display a maximum of 40 bits. Display bit width designation data is the output from a CPU 15 of the microcomputer 17 to be input to a display data storage area designation register 11 thereof. The display data storage area designation register 11 designates the X direction display bit width of display data stored in the display memory 10. Mask bit width designation data is output from the CPU 15 of the microcomputer 17 to be input to a mask bit width designation register 12. The mask bit width designation register 12 designates the mask bit width of data to be masked, i.e., data that is not re-written among the display bit widths designated by the display data storage area designation register 11.

The display data storage area designation register 11 and mask bit width designation register 12 designate X direction bit widths on the map of the display memory 10. The CPU 15 outputs address data for designating X and Y direction addresses. A write judgment/designation signal generator 13 receives the output of the display data storage area designation register 11, the output of the mask bit width designation register 12 and the address data from the CPU 15 and generates a signal necessary for a write control unit 14.

Figure 5:
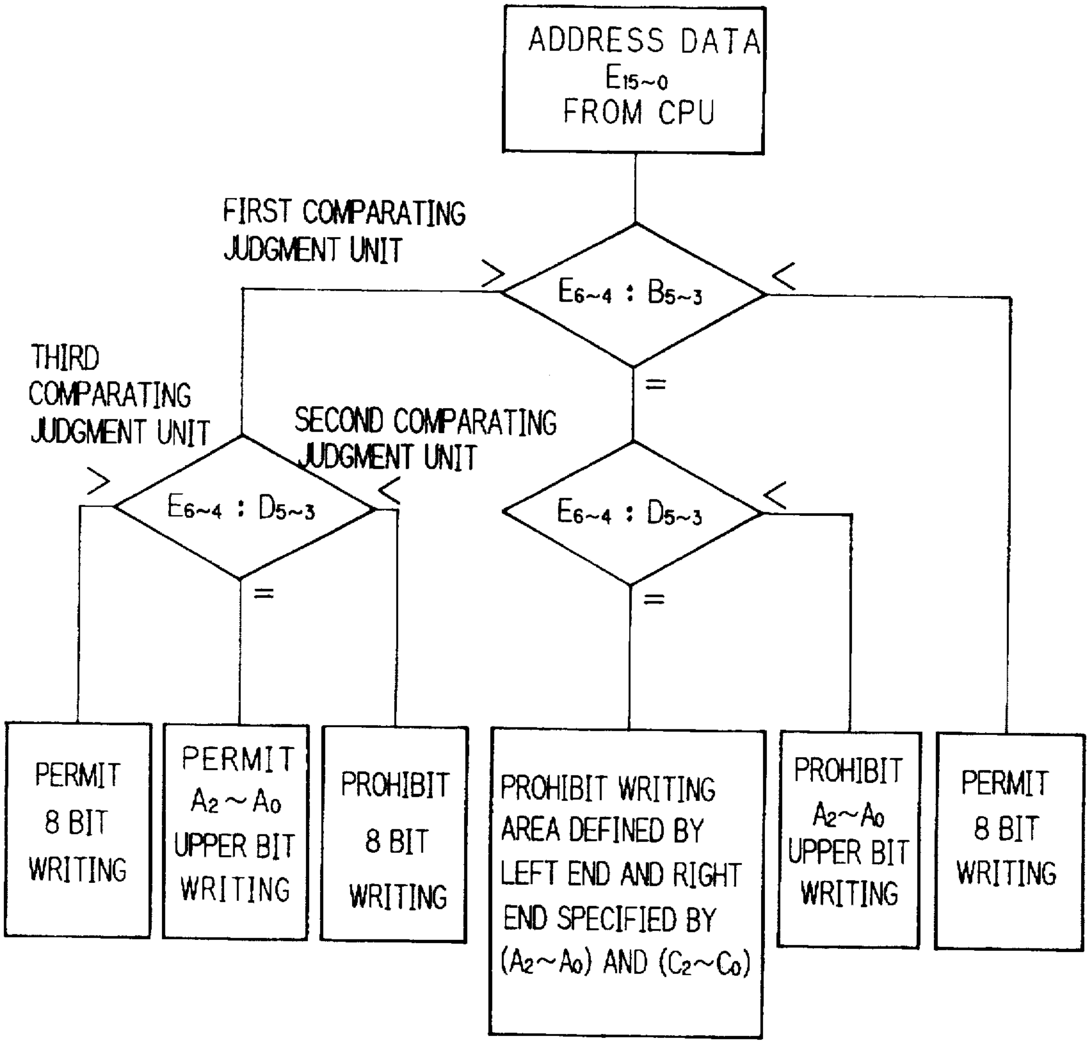
FIG. 5 is a flow chart of the operation of the write judgment/designation signal generator.

Now, the operation of the write judgment/designation signal generator will be described with reference to the flow chart of FIG. 5. Of the data that are set in the display data storage designation register 11, the data of the upper three bits, i.e., the 5-th to 3-rd bits, are denoted by A5 to A3, and the data of the lower three bits, i.e., the 2-nd to 0-th bits, are denoted by A2 to A0. Data as the result of subtraction of the data A2 to A0 from 6-th to 4-th bit data when the most significant bit address of the area address of the display memory 10 is expressed by a binary number, are denoted by B5 to B3. The upper three bits, i.e., 5-th to 3-rd bits, of the difference data between the data set in the display data storage designation register 11 and the data set in the mask bit width designation register 12, are designated by C5 to C3, and the lower three bits, i.e., 2-nd to 0-th bits, are denoted by C2 to C0. When the uppermost address of the address area of the display memory 10 is designated by a binary number, the data as a result of subtraction of data C5 to C3 from the 6-th to 4-th data, are denoted by D5 to D3. As address data expressed as binary data from the CPU 15, the 6-th to 4-th data, which are address data in the X direction of the display memory 10, are denoted by E6 to E4.

First, a first comparator compares data E6 to E4 with data B5 to B3. If E6 to E4<B5-B3, the pertinent address contains no boundary between a write prohibit area and a write permit area, so that 8-bit data can be re-written.

If the two data compared by the first comparator are the same, a second comparator compares data E6 to E4 with D5 to D3. If E6 to E4<D5 to D3, the pertinent address contains the boundary between the write prohibit area and the write permit area, and it is prohibited to write upper bits of the bits designated by data A2 to A0. If the two data compared by the second comparator are the same, the pertinent address contains the right end boundary and left end boundary of the write prohibit area and the write permit area. In this case, the right end boundary is designated by A2 to A0, and the left end boundary by C2 to C0.

Subsequently, the first comparator compares the data E6 to E4 with the data B5 to B3. If E6 to E4>B5 to B3, a third comparator compares the data E6 to E4 with the D5 to D3. If E6 to E4<D5 to D3, the pertinent address contains no boundary between the write prohibit area and the write permit area, so that it is prohibited to re-write 8-bit data.

Further, if the two data compared by the third comparator are the same, the pertinent address contains the boundary between the write prohibit area and the write permit area, and it is possible to re-write upper bits of the bits designated by data A2 to A0. The third comparator further compares data E6 to E4 with data D5 to D3. If E6 to E4>B5 to B3, the pertinent address contains no boundary between the write prohibit area and the write permit area, so that it is possible to re-write 8-bit data.

As is seen from the above operation, with the determination of the opposite ends of the write prohibit area in the display memory 10, four different states of address are defined, i.e., an address in which all the bits are in a write permit area, an address in which upper n bits are in a write permit area and lower (8-n) bits are in a write prohibit area, an address in which all the bits are in a write prohibit area, and an address, in which upper m bits are in a write prohibit area and lower (8-n) bits are in a write permit area.

Further, the write judgment/designation signal generator 13 determines the address in either of the above four data mask states that corresponds to address data supplied from the CPU 15 and generates a write permit signal and a write prohibit signal with respect to the bit unit corresponding to that address.

A write control unit 14 writes only effective bits of the write data from the CPU 15 in the display memory 10 according to the write permit signal and write prohibit signal with respect to the bit unit generated from the write judgment/designation signal generator 13.

Now, an operation for the re-writing of the display data in an example of the display data storage shown in FIG. 3. It is assumed that data "01010001B" is stored in address No. 165 of the display memory 10.

First, an employed bit width of "26 bits" is set in the display data storage area designation register 11, and a mask bit width of "11 bits" is set in the mask bit width designation register 12. The used bit width from the address No. 17X side is determined by the data set in the display data storage area designation register 11, that is, the write judgment/designation signal generator 13 determines that the right end of the write prohibit area is the position of the 6-th bit in address No. 14X which is the fourth byte from the address No. 17X side of the display memory 10, and determines, by calculating "15 bits" from the difference between "26 bits" that are data set in the display data storage area designation register 11 and "11 bits" that are data set in the mask bit width designation register 2, that the left end of the write prohibit area is the position of the 0-th bit in address No. 16X which is the second byte from the address No. 17X of the display memory 10. This means that the write prohibit area ranges from the 0-th bit of address No. 16X to the 6-th bit of address No. 14X.

Thus, in addresses No. 17X and No. 13X all the bits are in a write permit area, in address No. 16X the 7th to 1-st bits are in a write permit area and the 0-th bit is in a write prohibit area, in address No. 15X all the bits are in a write prohibit area, and in address No. 14X the 7-th and 6-th bits are in a write prohibit area and the 5-th to 0-th bits are in a write permit area.

When the CPU 15 provides the write data "11101000B" to address No. 165, in which the 7-th to 1-st bits are in a write permit area and the 0-th bit is a write prohibit area, the write judgment/designation signal generator 13 provides a write permit signal of the 7-th to 1-st bits of the address No. 165 and a write prohibit signal of the 0-bit of that address, and the 7-th to 1-st bits are written as data "1110100XB" (X being indicative of write prohibit) in the display memory 10. As the 0-th bit data "1B" before the re-writing is held, and the data in the address No. 165 after the re-writing is "111010001B".

Likewise, when the CPU 15 provides the write data "100101110" to address No. 179, in which all the bits are in a write permit area, the write judgment/designation signal generator 13 provides a write permit signal of 7-th to 0-th bits to the write control unit 14, and the data "100010110B" is written in the address No. 170 of the display memory 10.

In address No. 153 all the bits are in a write prohibit area. Thus, the write designation signal generator 13 provides a write prohibit signal of the 7-th 0-th bits to the write control unit 14, so that the data in the address No. 153 is held as such without any writing.

While the above first embodiment has the display data storage area register 11, this register is unnecessary in case where the entire display memory 10 is constituted by a display data storage area. That is, in this case the sole mask bit width designation register 12 suffices.

Figure 2:
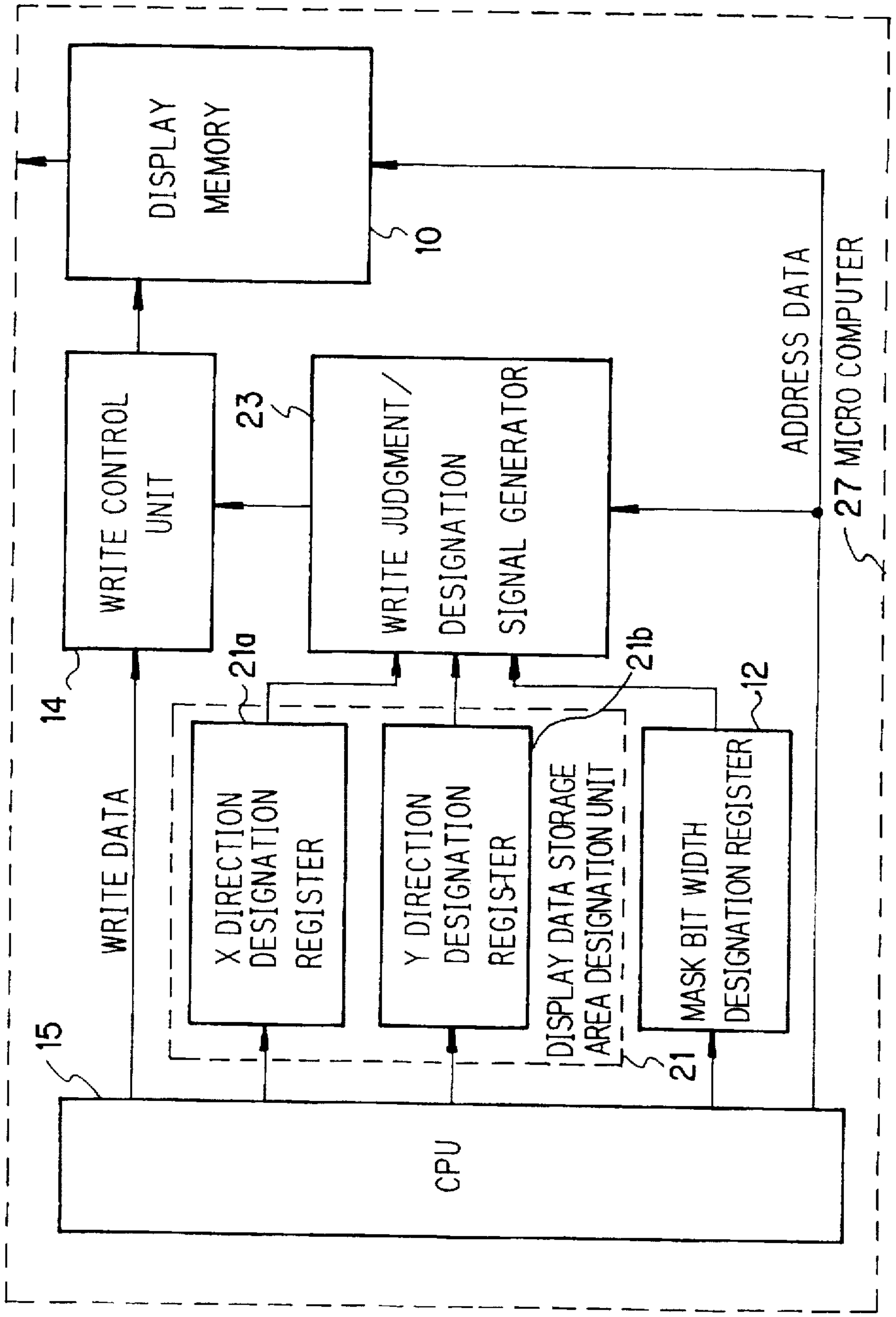
FIG. 2 is a block diagram of the data storage system according to second embodiment of present invention.

Now, a second embodiment will be described with reference to FIG. 2 showing a block diagram of the data storage system according to the second embodiment. The second embodiment is different from the first embodiment in the display data storage area designation means. More specifically, the display data storage area designation register is constituted by two registers, i.e., an X direction designation register 21_a_ for showing X direction storage area, and a Y direction designation register 21_b_ for showing Y direction storage area.

Figure 4:
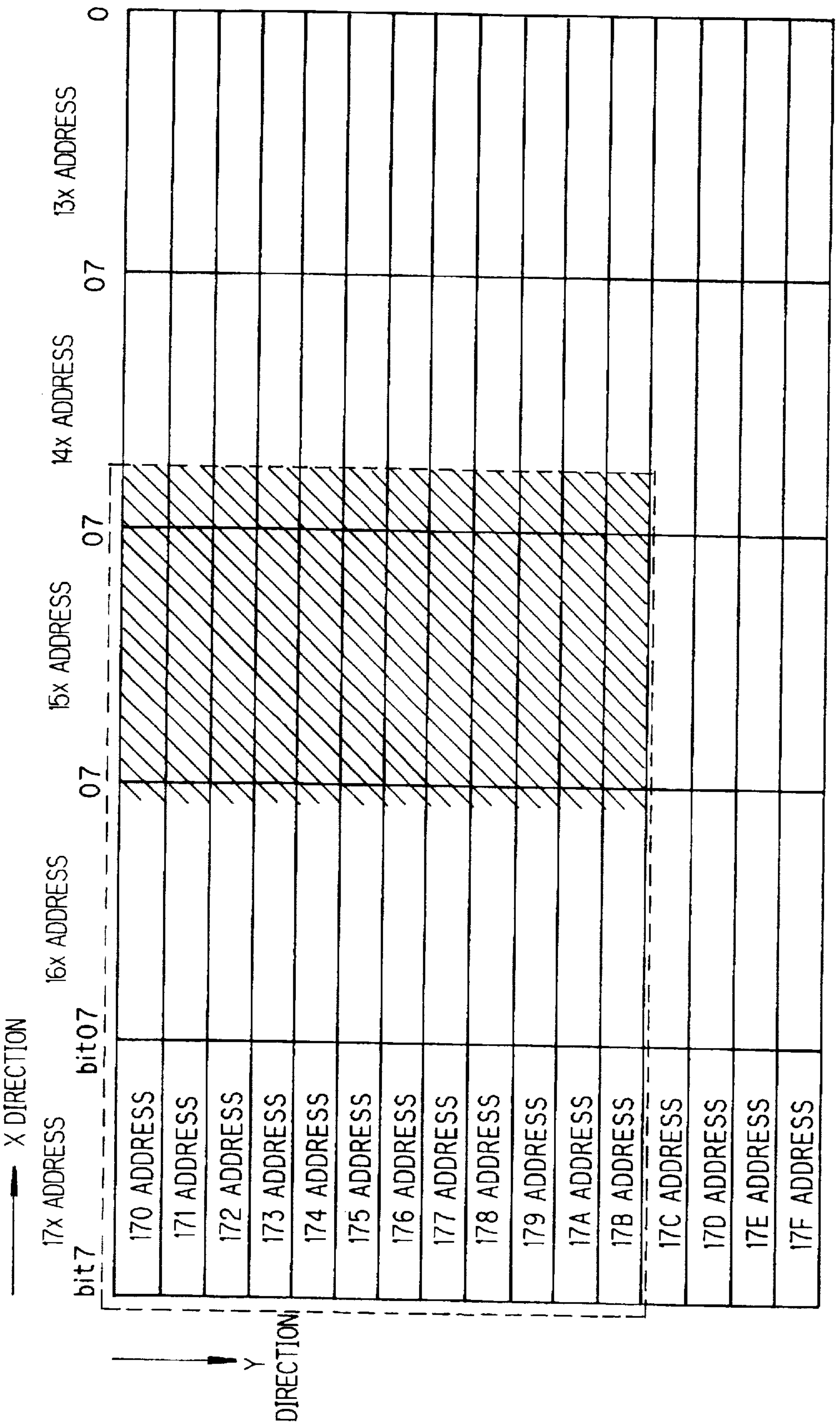
FIG. 4 shows an example of address map of the display data storage in the display memory according to the second embodiment.

FIG. 4 shows an example of address map of and display data storage in the display memory 10. Enclosed by the broken line rectangle is a display data storage area, and shown shaded is a digit data storage area, i.e., a write prohibit area in which there is no need of re-writing data in the use of the display memory. As shown in FIG. 4, the display memory 10 has areas of addresses No. 130 to No. 17F. Each address is capable of 8-bit accessing, and data of 5 addresses can be displayed as unit data. This embodiment is a display memory which is capable of displaying a maximum of 40 bits.

An operation of realizing display data re-writing in the FIG. 4 display data storage example will now be described.

First, by setting "26 bits" as bits of use in X direction in the X direction designation register 21_a_ of the display data storage area designation unit, the X direction in the display data storage area of the display memory 10 are from the 7-bit in address No. 17X to the 6-th bit in address No. 14X, and by setting "12 lines" as lines of use in the Y direction of the Y direction designation register 21_b_, the Y direction bits in the display data storage area of the display memory 10 are from address No. 1X0 to address No. 1XB. The data in these two registers 21_a_ and 21_b_ define a display data storage area as shown enclosed by the broken line rectangle as shown in FIG. 4.

By subsequently setting "11 bits" as mask bit width in the mask bit width designation register 12, the X direction data mask area in the display data storage area is from the 11-th bit from the lower side, i.e., the 6-th bit in address 14X to the 0-bit in address No. 16X. At this time, the display data storage area is up to address 1XB in the Y direction, and this means that the shaded area as shown in FIG. 4 is the write prohibit area in this embodiment.

It is now assumed that the data "01010001B" is stored in address 165 of the display memory 10. When the CPU 15 provides write data "11101000B" to address No. 165, in which the 7-th to 1-st bits are in a write permit area and the 0-th bit is in a write prohibit area, the write designation signal generator 23 provides a write permit signal of the 7-th to 1-st bits in the address No. 165 to write control unit 14, and the 7-th to 1-st bits are written as data "111010100XB" (X being indicative of write prohibit). Since the 0-th bit is held to be "1B", i.e., data before re-writing, the data in the address No. 165 after re-writing is "11101001B".

When the CPU 15 provides the write data "01000011B" to address No. 16C, in which all the bits are in a write permit area, the write judgment/designation signal generator 23 provides a write permit signal of 7-th to 0-th bits to the write control unit 14, and the data "01000011B" is written in the address No. 16C of the display memory 10. Likewise, when the CPU 15 provides the write data "10010110B" to address No. 179, in which all the bits are in a write permit area, the write judgment/designation signal generator 23 provides a write permit signal of the 7-th to 0-th bits to the write control unit 14, and data "10010110B" is written in the address No. 179 of the display memory 10.

When the CPU 15 provides the write data "01011010B" to address No. 153, in which all the bits are in a write prohibit area, the write judgment/designation signal generator 23 provides a write prohibit signal of the 7-th to 0-th bits to the write control unit 14, and the data in the address No. 153 is held without writing of any data.

Likewise, when the CPU 15 provides the write data "11010111B" to address No. 15E, in which all the bits are in a write permit area, the write judgment/designation signal of the 7-th to 0-th is provided to the write control unit 14, data "11010111B" to the address No. 15E of the display memory 10.

While this embodiment has been described by using display memory and display data, this is by no means limiting, and the embodiment is of course a useful technique in data write/read control of the storage system as well.

Figure 8:
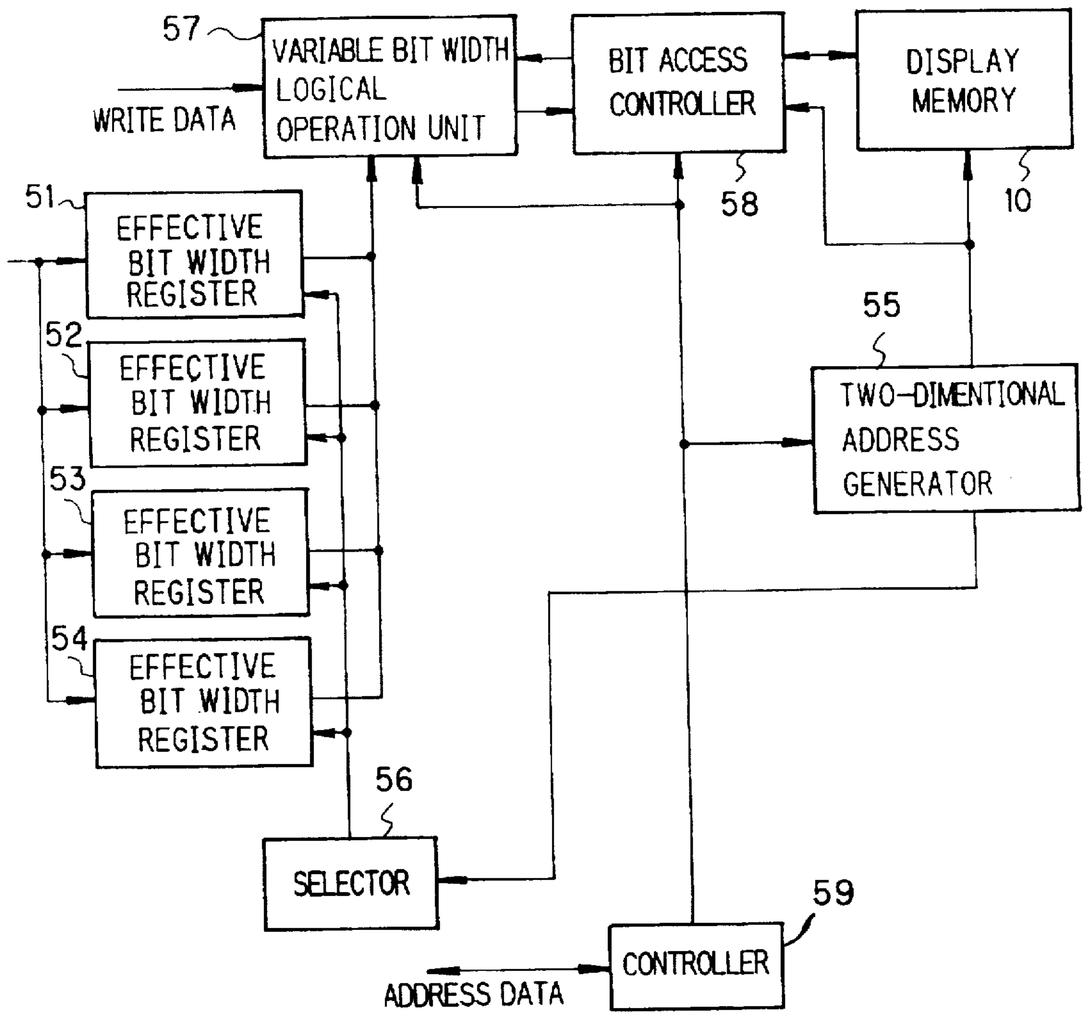
FIG. 8 PRIOR ART
FIG. 8 is a block diagram showing a data storage system having a plurality of registers for storing mask data corresponding to the display memory access unit bit width.
Figure 9:
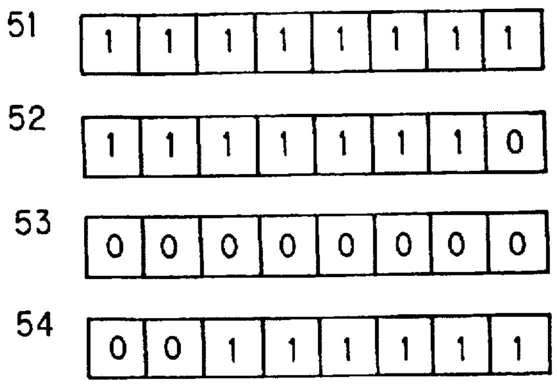
FIG. 9 PRIOR ART
FIG. 9 shows fixed data in the effective bit width registers 51 to 53 when realizing a mask example of data in the display memory 10 shown in FIG. 3.

For instance, in case where write control is necessary in given bit units with non-re-write data in the same address of memory after the setting of data that is always re-written such as fluorescent display panel display segment data and time division drive data that are determined by the display panel like digit data, in the data storage system as shown in FIG. 8 effective bit width registers for storing access unit mask data in the display memory have been necessary in a number corresponding to the bit width of the display memory access unit. In the first embodiment it is possible to reduce the number of registers from 40 to 12 by allowing re-writing of data in the display storage area designation register 11 and the mask bit width designation register 12.

Further, the prior art data storage system described before the variable bit width logic operation unit 57 performs operations on three different data, i.e., the externally supplied write data, mask data from the selected effective bit width register, and data stored in a re-write subject address of the display memory 10 as read out by the bit access control unit 58. Therefore, the circuit construction of the variable bit width logic operation unit has been complicated, thus leading to increase of the number of the overall elements. However, with the construction of the write judgment/designation signal generator which operates in the manner as shown in FIG. 5, the circuit construction is simplified, so that it is possible to reduce the number of elements.

In the data storage system the result of operation in the variable bit width logic operation unit 57 is stored in the re-write subject address of the display memory 10 via the bit access control unit 58, thus requiring considerable time in the data re-write process. According to the present invention, the circuit is simplified, and also the data process is simplified, so that it is possible to reduce time for the data re-writing.

Figure 6:
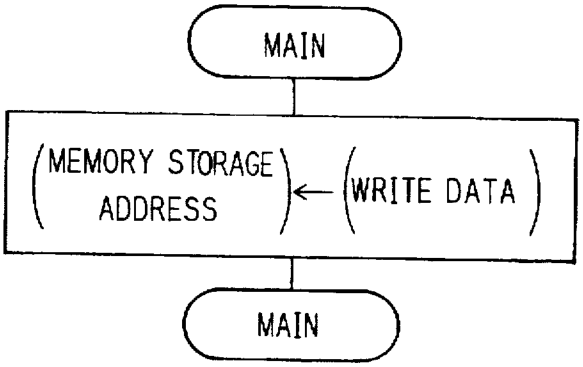
FIG. 6 shows flow charts of the operations of the storage control system according to the first and second embodiments.
Figure 7:
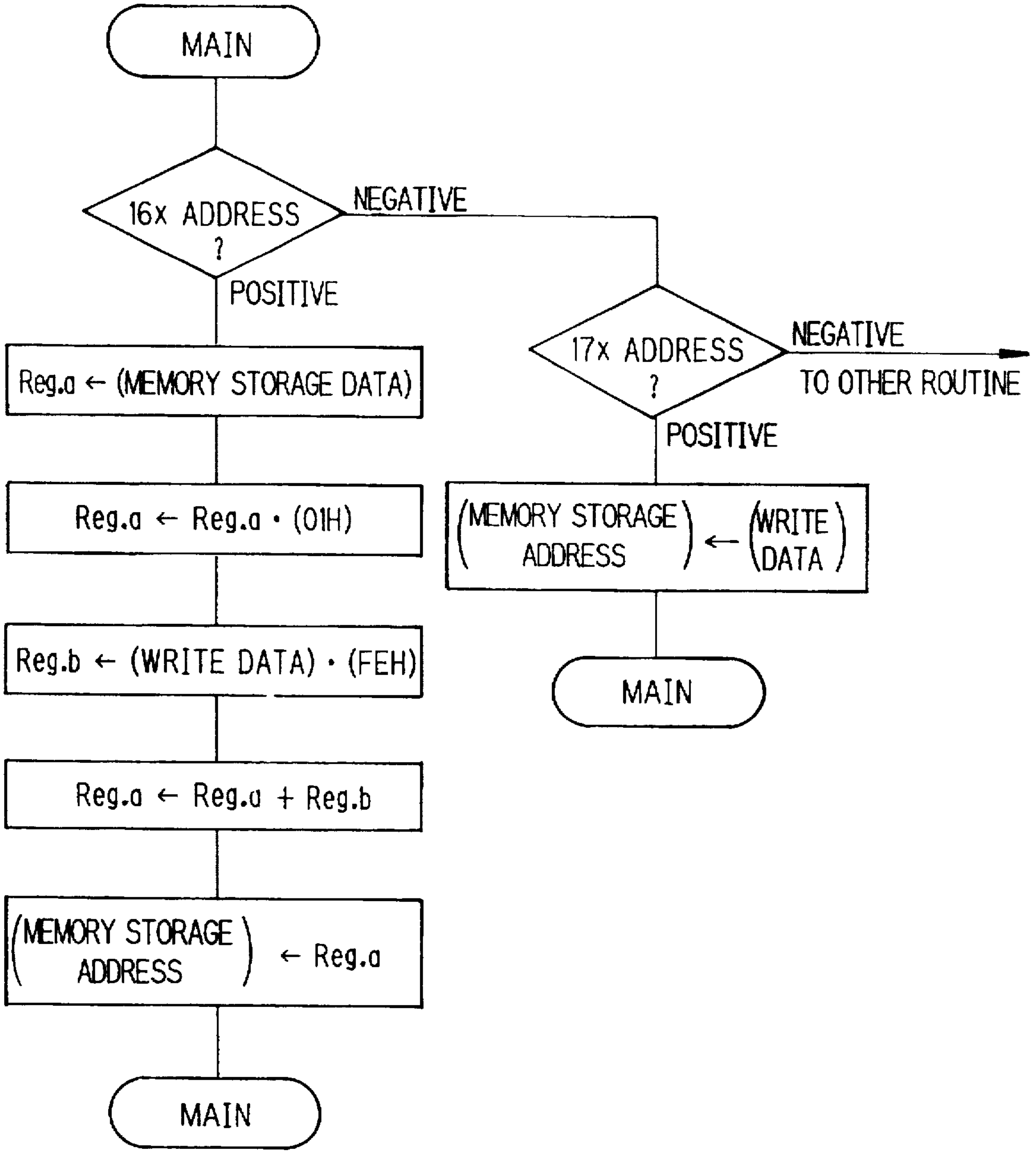
FIG. 7 PRIOR ART
FIG. 7 shows a flow chart of the operation according to the prior art system.

Unlike the operation of FIG. 7 of the prior art data storage system for mask control with software, the FIG. 6 flow of the first and second embodiments of the storage control system can be realized by one step, and thus it is of course possible to increase the process speed.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed:

1. A storage control system for a memory having a memory element array and a memory access unit for accessing the memory in a predetermined bit width, said storage control system comprising:

first means for holding data to designate an area of the memory whose contents are re-writable;

second means for holding data corresponding to a width of an area of the memory whose contents are masked and not re-writable;

means for comparing a supplied memory address and data of said first and second holding means; and means for prohibiting writing of data in a memory element corresponding to the area not re-writable when the result of comparison in the comparing means indicates that a non-re-writable area is contained in the bit width designated by the supplied memory address.

2. The storage control system according to claim 1, wherein said first holding means holds most significant bit information for the uppermost address of a non re-writable area.

3. The storage control system according to claim 1, wherein said first holding means holds bit data concerning re-writable columns of the memory and holds bit information concerning re-writable rows of the memory.

4. A storage control system comprising:

a memory divided by a plurality of bit boundaries;

means for accessing the memory with a number of bits between adjacent bit boundaries as a unit; and prohibiting means for prohibiting change of data contents with respect to a specific area of the memory by designating a write prohibit address on the basis of first data describing at least one side of the specific area and second data describing the width of the specific area.

5. A method of controlling reading and writing of data in a memory divided by a plurality of bit boundaries, said method comprising:

designating a write prohibit area by establishing a mask bit width of said write prohibit area;

judging whether a bit boundary of a supplied address is present in the prohibit area; and permitting writing of all data in the memory when a result of the judging indicates that no bit boundary is present and prohibiting the change of data in a write prohibit area on the basis of the bit boundaries when the judging indicates that a bit boundary is present.

6. The method according to claim 5 further comprising: designating a writable memory area by establishing a display bit width of a display area, and wherein said judging is determined based on comparisons between most significant bit information of the supplied address and difference information between address information for the display bit width of the display data storage area designation register and address information for the mask bit width of the mask bit width designation register.

7. Storage control system comprising:

a display memory having at least one write permit area and a write prohibit area, said memory operable to write in data and to read out data in response to an externally supplied address;

a display data storage area designation register for designating an X direction display bit width of display data stored in the display memory in response to display bit width designation data;

a mask bit width designation register for designating a mask bit width in a X direction of data to be masked in the display memory, said masked data corresponding to data that is not re-written among the display bit widths designated by the display data storage area designation register in response to mask bit width designation data;

a write judgment signal generator for determining the boundaries of the write prohibit area in the display memory to define at least four different states of an address, said address states including an address in which all the bits are in a write permit area, an address in which predetermined upper bits are in a write prohibit area, an address in which all the bits are in a write prohibit area, and an address in which predetermined upper bits are in a write prohibit area and predetermined lower bits are in a write permit area, said write judgment signal generator also determining the address state that corresponds to the supplied address data, and also generating a write permit signal and a write prohibit signal with respect to bit units corresponding to the supplied address; and a write control unit for writing effective bits of write data to the supplied address in a display memory according to the write permit signal and write prohibit signal supplied from the write judgment signal generator.

8. The storage control system of claim 6 wherein said write judgment signal generator determines the boundaries of the write prohibit area and the address state of the supplied address data based on comparisons between most significant bit information of the supplied address and different information between address information for the display bit width of the display data storage area designation register and address information for the mask bit width of the mask bit width designation register.

9. Storage control system comprising:

a display memory having at least one write permit area and a write prohibit area, said memory operable to write in and to read out data in response to an externally supplied address;

two display data storage area designation registers, respectively storing X and Y directions of display bit widths of display data sorted in the display memory in response to display bit area designation data;

a mask bit width designation register for designating a mask bit width in an X direction of data to be masked in the display memory, said masked data corresponding to data that is not re-written among the data display bit widths designated by the display data storage area designation registers in response to mask bit width designation data;

a write judgment signal generator for determining boundaries of the write prohibit area in the display memory to define at least four different states of an address, said address states including an address in which all the bits are in a write permit area, an address in which predetermined upper bits are in a write permit area and predetermined lower bits are in a write prohibit area, an address in which all the bits are in a write prohibit area, and an address in which predetermined upper bits are in a write prohibit area and predetermined lower bits are in a write permit area, said write judgment signal generator also determining the address state that corresponds to the supplied address data, and also generating a write permit signal and write prohibit signal with respect to the bit units corresponding to the supplied address; and a write control unit for writing effective bits of the write data to the supplied address in the display memory according to the write permit signal and write prohibit signal supplied from the write judgment signal generator.

* * * * *

UNITED STATES PATENT AND TRADEMARK OFFICE
CERTIFICATE OF CORRECTION

PATENT NO. : 5,777,632
DATED : July 7, 1998
INVENTOR(S) : Mizue Tanaka

It is certified that error(s) appears in the above-identified patent and that said Letters Patent is hereby corrected as shown below:

Col. 7, line 17, change "2" to --12--.

Signed and Sealed this

Fifth Day of January, 1999

*Attest:*

*Attesting Officer*

*Acting Commissioner of Patents and Trademarks*